United States Patent Office 3,534,460
Patented Oct. 20, 1970

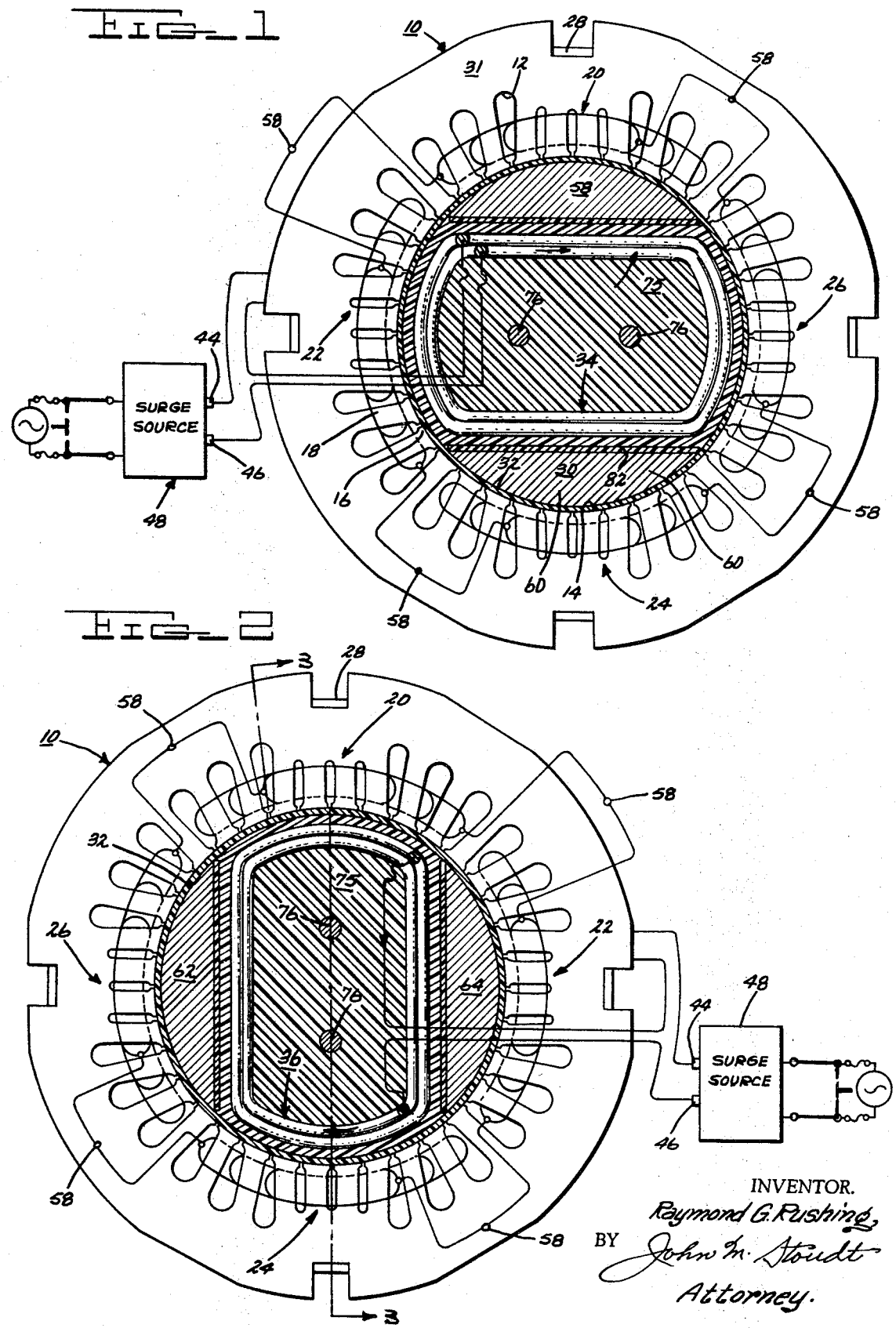

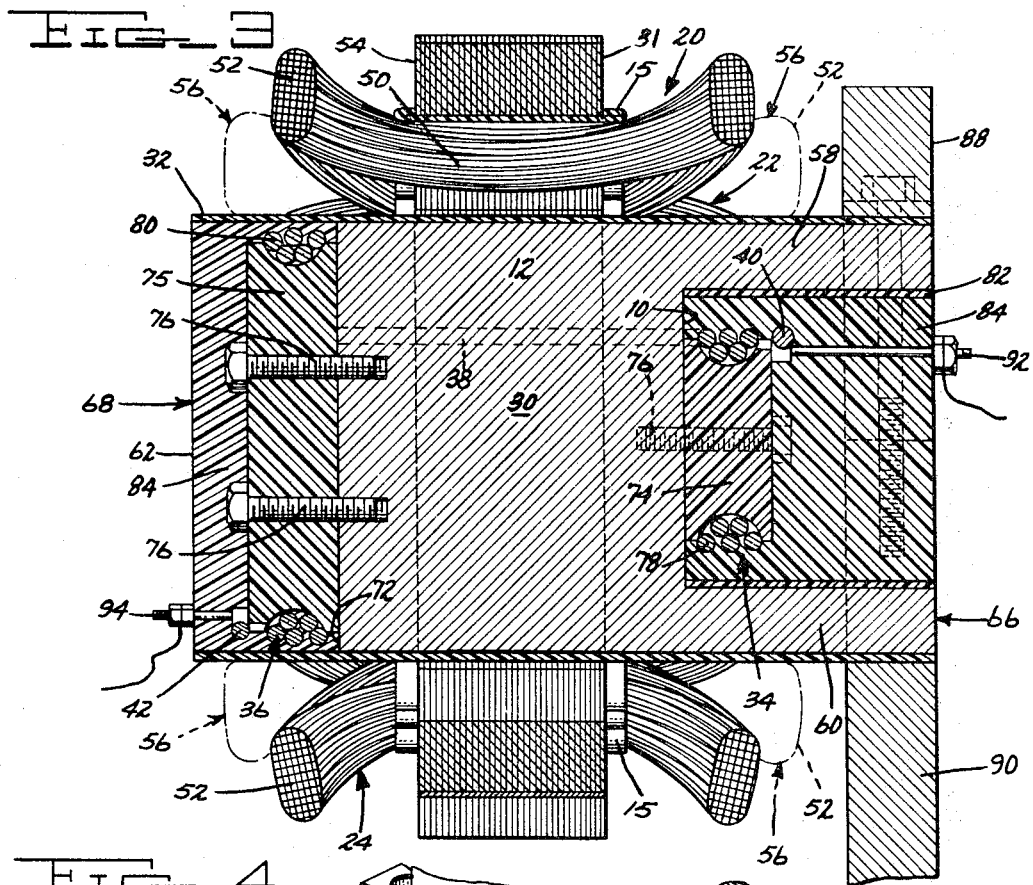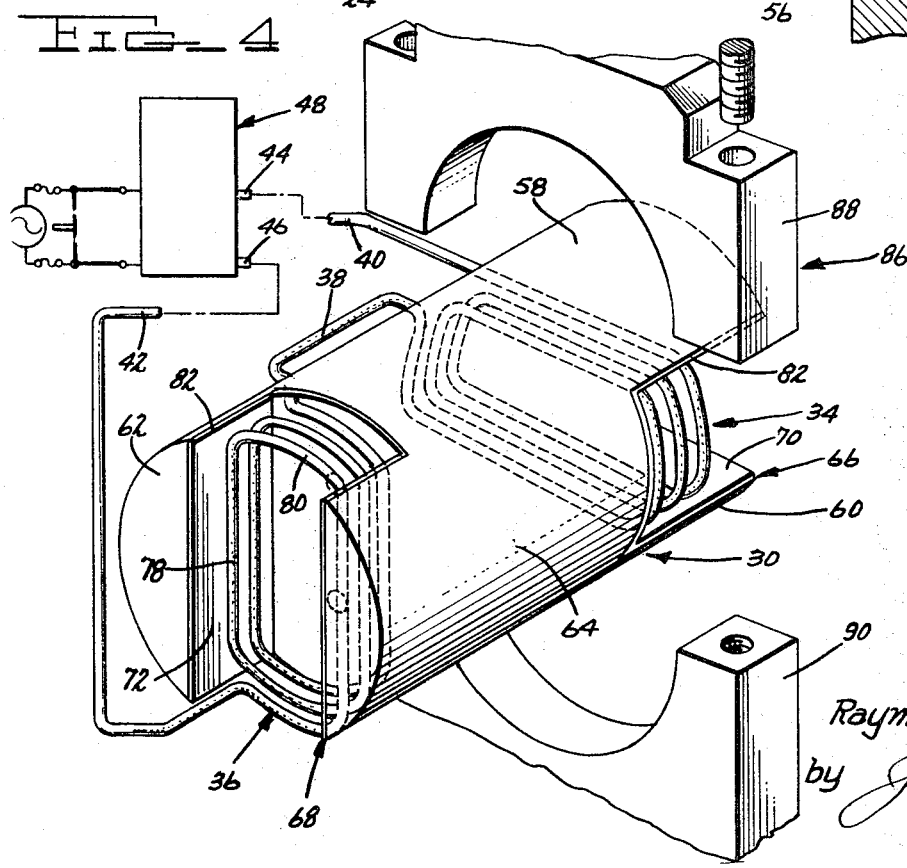

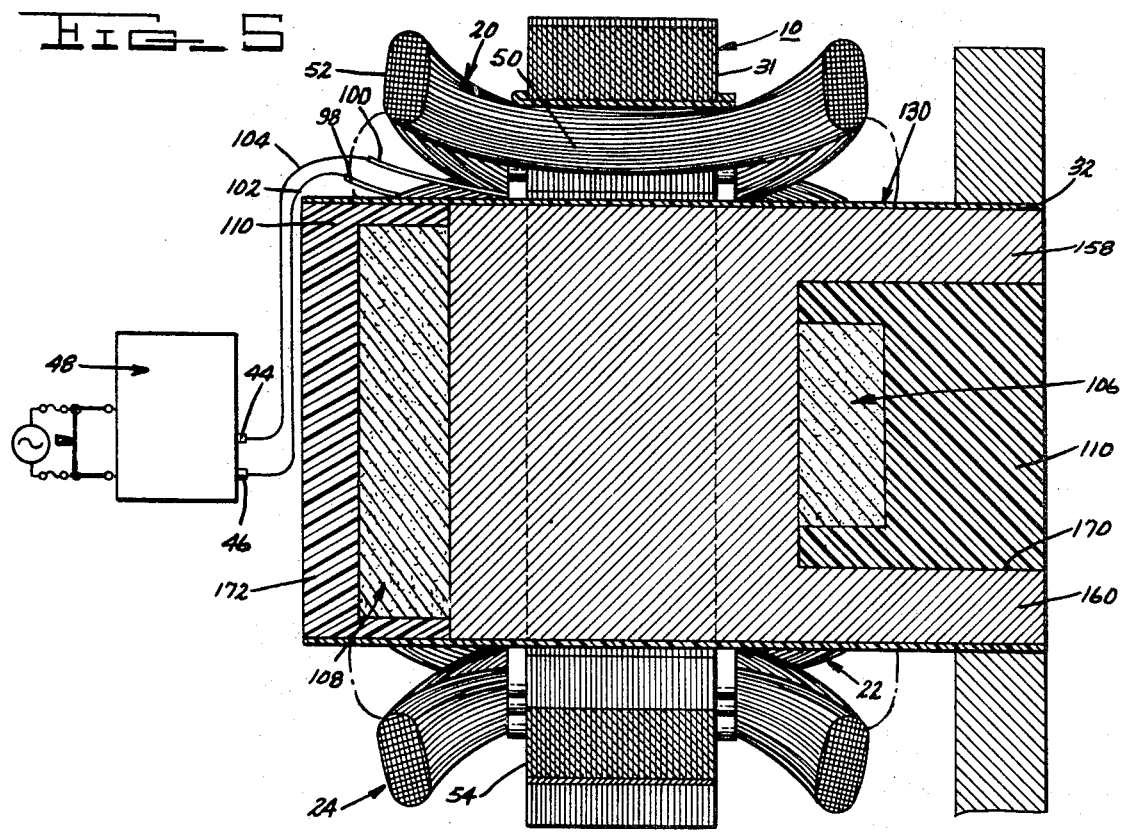
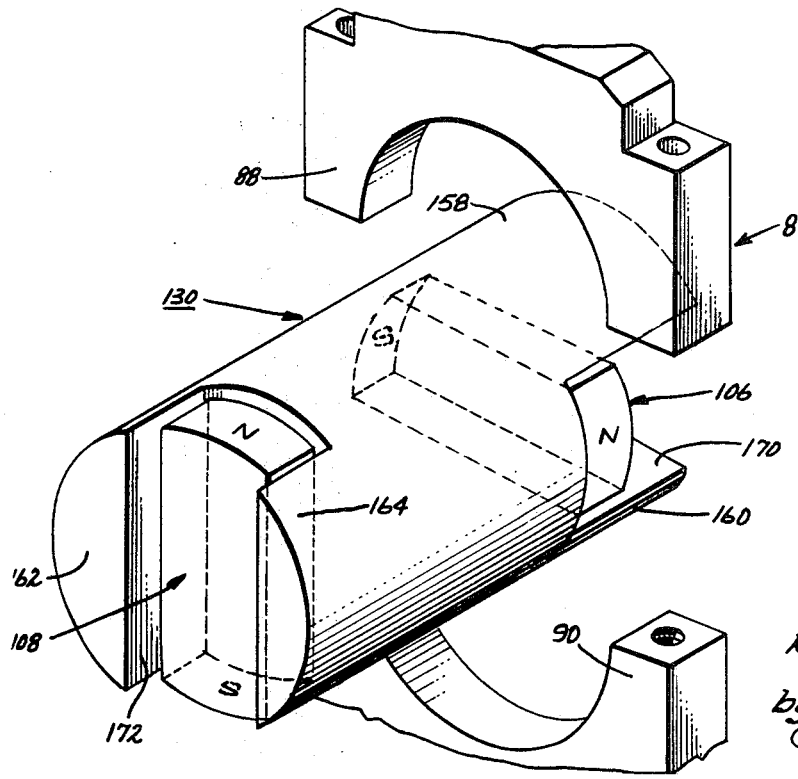

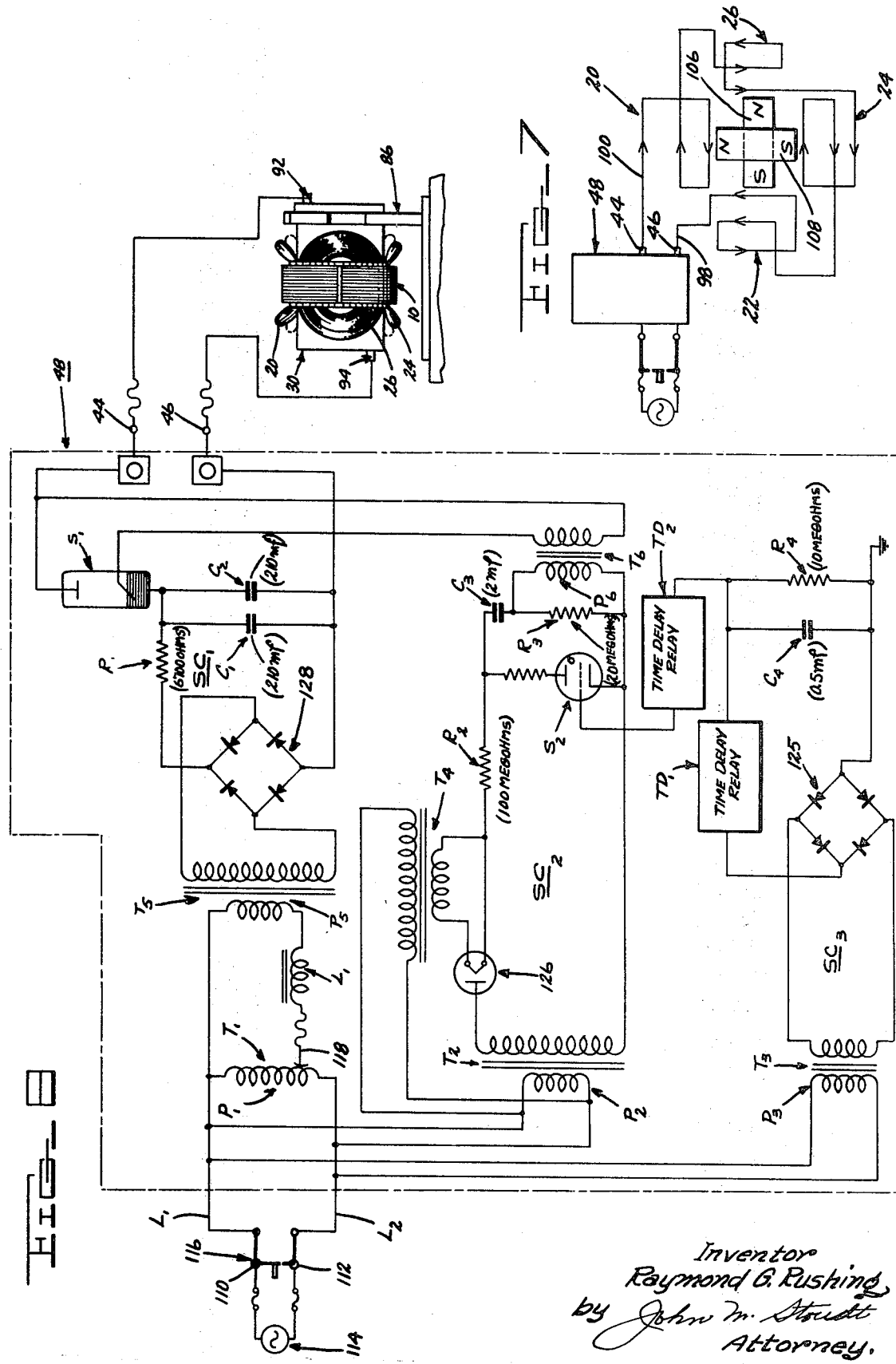

3,534,460
APPARATUS INCLUDING CIRCUITRY FOR EFFECTING COIL PRESS-BACK IN INDUCTIVE DEVICES
Raymond G. Rushing, Mentor, Ohio, assignor to General Electric Company, a corporation of New York
Original application July 28, 1966, Ser. No. 568,594, now Patent No. 3,407,473, dated Oct. 29, 1968. Divided and this application Aug. 2, 1968, Ser. No. 749,752
Int. Cl. H02k 15/06
U.S. Cl. 29—205                    6 Claims

ABSTRACT OF THE DISCLOSURE

Apparatus for effecting alterations in electrical coil configurations of an inductive device arranged in a load circuit. A pulsing circuit is connected between the load circuit and a source of alternating current to produce electrical energy pulses in the load circuit to attain the desired results. The pulsing circuit has three interconnected sub-circuits arranged to provide a predetermined charging period for an energy storage component, such as a capacitor bank, adapted to be connected across the load circuit and to automatically inject electrical energy pulses into the load circuit having the inductive device arranged therein to effect alteration in configuration of its electrical coils.

CROSS-REFERENCE TO RELATED APPLICATION

This application is a division of my co-pending application Ser. No. 568,594, filed July 28, 1966, now Pat. No. 3,407,473, granted Oct. 29, 1968, which in turn relates to my still earlier filed application Ser. No. 414,826, filed Nov. 30, 1964 which issued on Aug. 1, 1967 as U.S. Pat. No. 3,333,328.

BACKGROUND OF THE INVENTION

This invention relates generally to an improved apparatus including circuitry for effecting coil press-back in inductive devices, and more particularly to apparatus including circuitry for transferring the electrical windings carried by a core useful in a dynamoelectric machine between initial and desired positions.

It has been the usual practice in fabricating dynamoelectric machines to loosely place the electrical windings in for example, a motor stator, by machines which either wind the coils directly into the stator cores or which insert preformed coils into the stator cores. However, with each type of machine, after the windings are placed in the stator core, it is customary for the windings to be pressed-back or transferred from the initial position to a final position in the vicinity of the slot bottoms located away from the bore. This transferring or press-back procedure has heretofore been accomplished by mechanical press-back features either built into the coil placing machinery or by separate, mechanical press-back machines. Obviously, either manner of achieving mechanical press-back of stator windings entails the use of expensive, bulky machinery which incidentally is relatively slow and inefficient in operation, as the stator coils are usually individually pressed-back by the use of elaborate fixtures. Separate fixtures are normally required for each core and/or slot design. In some instances, where the cores incorporate unusual slot configurations or narrow entrances, no mechanical press-back is attempted in view of the difficulties presented by the core design.

Another draw-back of existing mechanical press-back machines is that there is of necessity physical contact between the machine and the outer surfaces of the coils during the press-back operation, with the resulting possibility of damage to the conductor wire insulation.

It is therefore highly desirable to provide an improved apparatus including circuitry for effecting coil press-back in various inductive devices, such as motor stators, which is versatile, eliminating the problems of expense, lack of speed, and damage to the wire as encountered in the prior art. It is also desirable to provide a method for either simultaneously pressing-back all of the coil groups carried for example, in a stator core or pressing-back only desired coil groups, while avoiding direct contact between the press-back means and the conductor wires. It is also advantageous to provide apparatus and arrangements for accomplishing coil press-back which incorporates the desirable features mentioned above.

SUMMARY OF THE INVENTION

Accordingly, it is an object of the instant invention to provide improved apparatus including circuitry for pressing back the electrical coils carried by inductive devices, such as dynamoelectric machines.

Another object is to provide an improved circuit arrangement especially effective in overcoming the drawbacks mentioned above and in producing the desired coil positions relative to a magnetic core in inductive devices effectively and efficiently.

In accordance with one form of the invention, I provide improved apparatus for effecting the desired press-back or alteration in configuration of an electrical coil (or coils in an inductive device which is mounted in an inductive load circuit. A pulsing circuit, especially efficient in producing electrical energy pulses to achieve the desired results, is connected between the load circuit and a source of alternating current. The pulsing circuit has energy storage means; e.g., a bank of capacitors in the illustrated embodiment, and components to supply a charging voltage to the storage means as well as normally open switch means connected across the output of the storage means to prevent its discharge into the load circuit.

A first sub-circuit is connected to the normally open switch means for its selective closing, the sub-circuit also having means to provide an electrical pulse and a second normally open switch means to which is connected at least second sub-circuit. This latter sub-circuit, in turn, has a second means to provide an electrical pulse and a normally open time delay means, with the second means connected through the delay means to the second normally open switch means. When the time delay means closes after a predetermined period of time, the second means provides an electrical pulse which sequentially closes the switch means of the second sub-circuit. Thereafter the first means provides an electrical pulse, causing the first switch means to close thereby allowing the storage means to discharge automatically an electrical energy pulse of preselected magnitude into the load circuit for effecting the desired alteration of the electrical coil of the inductive device arranged therein.

Thus, the invention provides versatile apparatus which efficiently, rapidly, yet inexpensively effects the desired coil press-back in various inductive devices, regardless of shape of such devices.

BRIEF DESCRIPTION OF THE DRAWINGS

The subject matter which I regard as my invention is particularly pointed out and distinctly claimed in the concluding portion of the specification. The invention itself, however, together with further objects and advantages thereof, may be best understood by reference to the following description taken in conjunction with the accompanying drawings in which:

FIG. 1 is an end view of a stator core having a coil carrying fixture in the bore thereof, with the fixture supporting a first coiled conductor in electromagnetic coupling relationship with portions of first and third opposed coil groups carried by the stator core, one end of the coiled conductor being connected in circuit with an energy surge source, incorporating the preferred embodiment of the present invention and the coil groups of the stator core being short-circuited;

FIG. 2 is a view similar to that of FIG. 1, illustrating the other end of the stator core and the coil carrying fixture, the fixture supporting a second coiled conductor connected in series relation with the first coiled conductor and connected in circuit with the energy surge source, the second coiled conductor being in electromagnetic coupling relationship with portions of second and fourth opposed stator coil groups and being offset ninety mechanical degrees from the first coiled conductor;

FIG. 3 is a vertical sectional view, partially in side elevation, taken substantially on the plane of the line 3—3 of FIG. 2, with two of the coil groups shown in their final pressed-back position relative to the stator core;

FIG. 4 is a simplified perspective view of one form of a fixture used in the practice of my invention;

FIG. 5 is a view similar to that of FIG. 2 illustrating the stator core and coil groups partially in section and partially in elevation, a modified fixture being supported in the stator bore and the coil groups shown connected in circuit with an energy surge source in accordance;

FIG. 6 is a simplified perspective view of the modified fixture illustrated in FIG. 5;

FIG. 7 is a schematic circuit diagram of a polar development of the stator coil groups shown in FIG. 5, with the coil groups connected in circuit with the energy surge source and the pair of magnets mounted in the fixture respectively supported in coupled relationship with opposed portions of the coil groups; and FIG. 8 is a schematic circuit diagram of one preferred form of the invention especially effective in pressing-back coils in inductive devices.

DESCRIPTION OF THE PREFFERRED EMBODIMENT

Turning now specifically to the drawings, the preferred form of the invention has been illustrated in connection with the simultaneous press-back of the electrical windings arranged in the slots of a dynamoelectric machine stator core, the inductive device generally denoted by reference numeral 10. in FIG. 1, with reference to stator core member 10, the core slots identified by numeral 12 are equidistantly spaced about a central bore 14 of the stator core, the bore being defined by tooth line 16 of stator tooth sections 18. The slots 12 are provided with slot liners 15, conventionally provided to insulate the conductor wires carried in the core from the core material. The stator core 10 illustrated in FIGS. 1–3 is a four-pole stator core having four coil groups, respectively denoted by reference numerals 20, 22, 24 and 26. The coil groups are each of the well-known distributed wound type, each including three sets of serially connected coils. The stator core member 10 is conventionally formed from a stack of magnetic laminations, stamped out of suitable thin sheet material, which are secured together by standard keys 28 frictionally received in grooves extending transversely across the stator core 10.

Referring specifically now to FIG. 1, it will be observed that one end face 31 of the core member 10 is shown in elevation, the electrical winding including the aforementioned four coil groups being shown in schematic form. There is supported in the stator bore 14 a fixture or structure 30 of non-magnetic electrically conductive material such as copper or aluminum. Further, insulation 32 is provided about the fixture 30 in order to insulate the fixture from the conductor wires of the various coil groups to prevent shorting therebetween. It will be understood that the insulation 32 may be a separate hollow cylindrical sleeve shaped to fit the bore 14, as illustrated, or may also be an integral insulation layer sprayed or otherwise applied directly to the outer surface of the fixture 30.

Referring now to FIGS. 3 and 4 in conjunction with FIG. 1, it will be observed that an electrically conductive means in the form of a coiled electrical conductor generally denoted by reference numeral 34 is mounted in the fixture 30, the coiled conductor 34 being in electromagnetic coupling relationship with portions of the coil groups 22 and 26. It will also be seen that a second electrically conductive means in the form of a second coiled conductor 36 is supported in the other end of the fixture 30, the two coil conductors 34 and 36 being serially connected, as by connecting portion 38, as shown in the simplified illustration of FIG. 4. Opposite ends 40 and 42 of the coil conductors 34 and 36 are respectively adapted for connection to the output terminals 44 and 46 of an energy surge source generally denoted by reference numeral 48. The second coiled conductor 36 is supported in electromagnetic coupling relationship with portions of the coil groups 20 and 24 so that, in effect the coils and core are arranged in a load circuit.

As illustrated in FIGS. 1–4 inclusive, the coil groups 20, 22, 24 and 26 are being pressed-back into the bottom of the slots 12, away from the bore 14, and the end turns are also pressed-back, after the coil groups have been initially placed in the slots by a suitable machine for that purpose. With the coil groups loosely placed in the slots, the fixture 30 is moved into position in the bore 14, the fixture 30 incidentally acting to retain the loosely placed coils in the slots prior to their press-back to mount the core and coil groups in the load circuit. In the illustrated exemplification of my invention, the coil groups, each of which includes side portions 50 and connecting end turn portions 52, are simultaneously pressed-back or compacted. Thus, the side portions are pressed toward the bottoms of their respective slots, and the end turn portions 52 are pressed-back toward the opposed stator faces 31 and 54. The movement of the coil groups is best illustrated in FIG. 3, wherein the final position of the coil groups 20 and 24 is represented by lines in full, while their initial position is represented by phantom lines 56. To achieve this end, as shown in the arrangement of FIGS. 1 and 2, the four coil groups are electrically connected by suitable interpole connections 58 to provide a closed path for the flow of induced current. It will be apparent by viewing FIGS. 1 and 2 that the coil groups 20, 22, 24 and 26 are connected in their normal fashion, i.e., with adjacent coil groups being oppositely wound to have opposite polarities. When the fixture 30 is inserted into the bore, the coiled conductor 36 is rigidly supported in electromagnetic coupling relationship with one of the end turn portions 52 of the coil groups 20 and 24 while being shielded from the end turn portions of the coil groups 22 and 26 in a manner to be discussed more fully hereinafter. Further it will be understood, while not specifically illustrated in FIG. 3, that the coiled conductor 34 is rigidly supported in magnetic coupling relationship with one of the end turn portions 52 of the coil groups 22 and 26 inasmuch as the first and second coil conductors are in a 90° mechanical offset relationship with each other.

With the ends 40 and 42 of the coiled conductors 34 and 36 connected to the output terminals 44 and 46 of the energy surge source 48, at least one high energy surge is injected into the two serially connected coiled conductors, thereby establishing a transient magnetic field about the two coiled conductors. The transient magnetic field produced about coiled conductor 34 links the adjacent end turn portions 52 of the coil groups 22 and 26, thereby inducing current flow in these coil groups. Similarly, the magnetic field about coiled conductor 36 induces current flow in coil groups 20 and 24. The four coil groups are serially connected to achieve additive current flow therethrough, and this current flow establishes magnetic fields at the end turn regions opposing the magnetic fields established about the coiled conductors 34 and 36. The interaction of these opposing magnetic fields will cause the electromagnetically coupled end turn portions 52 to be pressed-back, away from the rigidly supported coiled conductors 34 and 36, toward the stator faces 31 and 54 to their final positions as illustrated in FIG. 3, and to be compacted or bundled together. It will be understood that only one end turn portion of each coil group, and not the remaining portions of the coil groups are electromagnetically coupled with the coiled conductors.

Therefore, only the one coupled end turn portion of each coil group is displaced due to this coupling. More particularly, it will be understood that the coiled conductor 34, while it is electromagnetically coupled with one of the end turn portions 52 of the coil groups 22 and 26, it is shielded from the corresponding end turn portions 52 of the coil groups 20 and 24 by portions 58 and 60 of the structure 30 which lie between the coiled conductor 34 and the coil groups 20 and 24. Further, the coiled conductor 36 is electromagnetically coupled with one of the end turn portions 52 of the coil groups 20 and 24, but is shielded by the portions 62 and 64 of the structure 30 which lie between the coiled conductor 36 and the coil groups. It is believed that the shielding effect occurs due to the particular composition of the srtucture 30, i.e., its non-magnetic electrically conductive composition which enables it to conduct eddy currents. The circulating eddy currents generate a magnetic field which apparently opposes or suppresses the carrying of flux lines in the structure portions between the coiled conductor 34 and the coil groups 20 and 24 and between the coiled conductor 36 and the coil groups 22 and 26, thereby producing a shielding effect.

It will be observed in FIG. 3 that the side portions 50 of the various coil groups are also pressed-back. Further, the end turn portions of the coil groups which are not electromagnetically coupled by the coiled conductors 34 and 36 are also pressed-back toward the core faces and compacted. This press-back of the remaining portions of the coil groups, i.e., the portions other than the coupled end turn portions is accomplished by supporting the electrically conductive non-magnetic structure 30 adjacent these remaining portions of the coil groups. Thus, when current is induced into the four coil groups, eddy currents will be generated in the structure 30 adjacent the remaining portions of the coil groups, establishing a transient magnetic field which coacts with the magnetic field about the remaining portions of the coil groups, transferring the remaining portions to the desired final position. It should therefore be appreciated that I am able to simultaneously press-back and compact the four coil groups 20, 22, 24 and 26 carried by the stator core 10 without physically contacting the conductor wires comprising the coil groups. Further, the press-back and compaction occurs rapidly and efficiently, without the necessity of inserting any mechanical means into the core slots 12 in order to effect such compaction and press-back.

If it is desired to press-back only two opposing coil groups of the stator core at one time, this may be accomplished by way of example, by arranging the interpole connections 58 between the coil groups to provide a closed path only between two opposing coil groups such as groups 20 and 24 or 22 and 26. At this time, the injection of an energy surge into the coiled conductors 34 and 36 will generate transient magnetic fields about each coiled conductor and current flow will be induced in the connected pair of coil groups. No current will be induced, however, in the unconnected coil groups, and hence no transfer of these coil groups will occur. Further, it will be understood that the above may be practiced with other than the four-pole stators as illustrated in FIGS. 1–4, as for example a six-pole stator. When practicing my invention with a six-pole stator, the coil groups carried by the stator may be interconnected in their usual manner thereby to provide a closed electrical path for induced current, and the fixture 30 positioned to electromagnetically couple end turn portions of only two opposing pairs of coil groups to accomplish the desired coil pressback. The fixture may then be rotated to electromagnetically couple portions of the other coil groups as required to accomplish the desired coil press-back.

It will be observed in FIG. 4 that the fixture 30, briefly described above includes an elongated generally cylindrical body, constructed of electrically conductive nonmagnetic material such as copper or aluminum. While I have shown the fixture 30 as a solid cylinder, it will be appreciated that it may also be a hollow cylinder, so long as it is able to conduct eddy currents and support the coiled conductors 34 and 36 therein.

In order to support the coil conductors 34 and 36 in the fixture 30, I have provided in opposite ends 66 and 68, the slots 70 and 72, the slots being ninety mechanical degrees angularly offset from each other. The slot 70 is open at opposite ends of the fixture 30 and closed at the side by the shielding fixture portions 58 and 60 while the slot 72 is open at opposite ends and closed at the sides by the shielding fixture portions 62 and 64. It will be readily apparent by viewing FIGS. 1-4 that the slots are generally of the same width and length, the only difference therein being in the relative offset or rotated positions of the slots in opposite ends of the fixture 30.

Referring now to FIGS. 3 and 4, it will be observed that the coiled conductors 34 and 36, while illustrated in simplified form in FIG. 4, are in actuality wound on similar insulated forms 74 and 75, the forms being mounted by suitable mounting means such as the screws 76 in the bottoms of the slots 70 and 72. The insulated forms are provided to enable the coiled conductors to be formed in their illustrated configuration, to provide means for mounting the coiled conductors in the slots, and to prevent electrical shorting between the coiled conductors and the structure 30 when an energy surge is injected into the coiled conductors in accordance with my method. Each coiled conductor 34 and 36 includes a number of wound turns, which by being wound on the forms 74 and 75, are provided with long sides 78 joined by short sides 80. As will be appreciated, the short sides 80 are relatively flat and are supported substantially adjacent the outer surface of the fixture 30 while the long sides 78 are shielded by the fixture portions 58, 60, 62 and 64 as explained above. This particular arrangement of the coiled conductors 34 and 36 is provided in order to place the short sides 80 as close as possible to the end turn portions of the coil groups to which they are electromagnetically coupled to provide the most efficient magnetic coupling therebetween. Further, it will be observed that the sides and bottom walls of the slots 70 and 72 are provided with insulation 82, thereby to insure against the possibility that the coil conductors may come into electrical contact with the structure 30. In order to further avoid the possibility of shorting, and to secure the forms 74 and 75 in the fixture 30, after the coil conductors are wound on the forms 74 and 75, and the forms mounted in the slots on the bottom walls thereof by the screws 76, the slots are filled with a cured thermosetting epoxy resinous material 84 to encase the forms 74 and 75 and their coiled conductors, thereby firmly establishing the desired relationships of the coiled conductors in the fixture 30.

In order to support the fixture 30 a supporting structure generally denoted by reference numeral 86 and including an upper portion 88 and a lower portion 90 is provided (FIGS. 3 and 4). The end 66 of the fixture 30 is elongated relative to end 68, in order to enable the fixture to be supported in the structure 86, with the coiled conductor 34 positioned adjacent the electromagnetically coupled end turn portions 52 of coil groups 22 and 26.

In order to electrically connect the coiled conductors 34 and 36 of the load circuit to the surge source or pulsing circuit 48, a terminal 92 is mounted in the slot 70 of the fixture 30, with one end suitably attached to the form 74, and with the end 40 of the coiled conductor 34 suitably attached to this end of the terminal. The terminal 92 is firmly mounted in the fixture 30 as it is encased in the resinous material 84. Similarly, a terminal 94 is mounted in the slot 72 with one end attached to the form 75, one end 42 of the coiled conductor 36 connected to the terminal to enable coiled conductor 36 to be connected to the surge source 48. Thus, by referring to FIGS. 1 and 2 in conjunction with FIG. 3, it will be observed that the ends 42 and 40 of the coiled conductors are respectively connected by means of the fixture terminals 94 and 92 to the source output terminals 44 and 46, and by virtue of the connecting portion 38, serially connected with each other.

When an energy surge is produced at the source output terminals 44 and 46, current will flow through the two coiled conductors 34 and 35 in the load circuit, and since the coiled conductors 34 and 36 are oppositely wound, current will flow oppositely therethrough thereby producing magnetic fields of opposite polarity in accordance with the practice of my method. It is necessary to establish opposite magnetic fields about the two coils 34 and 36 when the coil groups 20, 22, 24 and 26 are connected in their normal manner as illustrated in FIGS. 1 2 and in order to produce additive current flow through the coil groups. It will be realized, of course, that it is the manner in which the interpole connections 58 are made between the coil groups which affects the current path therethrough.

Turning now to the arrangements disclosed in FIGS. 5–7 inclusive, I have shown a variation of the arrangement of the first and second exemplifications of my invention for pressing-back the coil groups 20–26.

In FIG. 5 for example, I have illustrated a stator core 10 identical to the stator core described in reference to FIGS. 1–3 above. The stator core 10 includes the same four coil groups 20, 22, 24 and 26, and as a matter of convenience, like parts of the stator core are identified by like reference numerals. In this exemplification of my invention, I have connected free and opposite ends 98 and 100 of the stator winding to electrical leads 102 and 104 and these leads to the output terminals 46 and 44 of the surge source 48. It will be understood that by such connections, when the surge source 48 is energized, a high energy surge of current is injected into the coil groups 20–26 of the stator core 10, and by the instantaneous current flow therethrough a dynamic magnetic field is produced about the four coil groups.

Rigidly supported a fixture or structure 130 is disposed in the bore 14 of the stator core 10 by means of the supporting structure 86. The fixture 130 is similar in some respects to the fixture 30 described above. Thus, the fixture 130 comprises an elongate cylindrical body of electrically conductive non-magnetic material such as copper or aluminum and includes the slots 170 and 172 in the opposite ends thereof as in the fixture 30. The slots 170 and 172 are offset or rotated 90 mechanical degrees from each other. As will be apparent by viewing FIGS. 5 and 6, the slots 170 and 172 are open at each end and are closed at the sides by the shielding portions 158, 160 and 162, 164 of the fixture 130 respectively. Further, a cylindrical sleeve 132 of insulating material embracingly engages the outer peripheral surface of the structure 130 in order to insulate the structure from the core carried coil groups.

In order to provide a magnetic field to interact with the dynamic magnetic field formed about the end turn portions 52 of the four coil groups carried by the core 10, first and second means for producing magnetic fields in the form of elongate bar type permanent magnets 106 and 108 are respectively mounted in the slots 170 and 172 of the fixture 130. The magnets are secured in the slots by a thermosetting epoxy resinous material 110, which, as will be apparent from FIG. 5, fills the slots thus rigidly mounting the magnets 106 and 108 therein. The magnets are thus supported in 90 degree offset relation with each other and their respective polarities are indicated in FIG. 6. It will be seen that the ends of the magnets 106 and 108 are relatively close to the outer peripheral surface of the fixture 130 while the sides of the magnets are shielded by the aforementioned fixture portions 158 and 160 and 162 and 164, respectively. This shielding effect is believed to be identical to the effect described above. The magnet 108 is thereby in electromagnetic coupling with the end turn portions 52 of coil groups 20 and 24 extending from the stator face 54, while the magnet 106 electromagnetically couples the end turn portions 52 of the coil groups 22 and 26 extending from the stator face 31.

When an energy pulse is injected into the coil groups 20–26 and the dynamic magnetic field is produced thereabout, the interaction between the permanent magnet fields and the dynamic magnetic fields will cause the aforementioned end turn portions 52 of coil groups 20 and 24 and 22 and 26 to be pressed-back towards the stator faces 54 and 31 respectively. Further, since the structure 130 is electrically conductive non-magnetic material capable of conducting eddy currents, there will be produced in the structure transient magnetic fields which will coact with the magnetic fields about the remaining portions of the coil groups and thereby cause these remaining portions to be pressed-back and compacted. Thus, the side portions 50 of the various coil groups will be pressed-back into the bottoms of the stator slots and the other end turn portions will be pressed-back towards the stator faces 31 and 54 and also compacted. This movement of the coil groups is illustrated in FIG. 5 with the original position of the coil groups being shown by lines in phantom and the final position being shown by lines in full.

Referring again to FIG. 6, it will be seen that a supporting structure 86 including an upper portion 88 and a lower portion 90 is provided in order to support the fixture or structure 130, thereby to allow a stator core such as the core 10 to be supported on the fixture in order to accomplish my method. The magnet 106 is rigidly supported in electromagnetic coupling with one of the end turn portions 52 of the coil groups 22 and 26, the magnet 106 being shielded from the coil groups 20 and 22 by the portions 158 and 160 of the fixture 130. The magnet 108 is rigidly supported in electromagnetic coupling with the end turn portions 52 of the coil groups 20 and 24 while being shielded by the fixture portions 162 and 164 from the coil groups 22 and 26. The coil groups 20–26 are serially connected for providing a closed path of current therethrough, and opposite ends 98 and 100 thereof are connected to the output terminals 44 and 46 of an energy surge source 48, a high energy surge being injected into the coil groups. The instantaneous current in the coil groups produces a transient magnetic field thereabout which interacts with the fields produced by the magnets 106 and 108 as well as the fields produced by the eddy currents in the fixture 130, thereby transferring the coil groups 20–26 to their desired final position in the stator core 10 by the resulting interaction of magnetic forces.

In order to understand how the stator coil groups 20–26 are wound and their relative position to the magnets 106 and 108, reference may be made to FIG. 7. I have shown a schematic circuit diagram of a polar development of the stator coil groups 20–26, with the ends 98, 100 of the coil groups 22 and 20 shown connected to the output terminals of the energy surge source 48, and the magnets 106 and 108 supported in magnetic coupling relation with the end turn portions of opposed coil groups. It will be seen by the indicating arrows on the schematic representations of the coil groups in FIG. 7 that current will flow through the serially connected coil groups due to the interpole connections therebetween. Further, it will be seen that the magnets 106 and 108 are positioned to present opposing magnetic fields to the end turn portions of opposed coil groups, thereby to cause the required interaction of magnetic forces between the transient and fixed fields, and to transfer the end turn portions away from the rigidly supported magnets.

Having specific reference now to FIG. 8, I will now more fully describe the operation of the energy surge source or pulsing circuit 48 as shown connected to the load circuit generally in FIGS. 1, 2, 4, 5 and 7 in block diagram form. The source 48 has a bank of capacitors $C_1$ and $C_2$ connected in parallel to provide a high energy surge or pulse of preselected magnitude. The capacitors are charged to a selected voltage level and selectively discharged by ionizing an ignitron $S_1$ to a conductive state. In the practice of my invention, it is desirable to arrange the surge source 48 for supplying energy of up to 8,820 joules, using capacitors rated at 210 microfarads.

The pulsing circuit 48 is effectively divided into, and can best be described by referring to three sub-circuits denoted as $SC_1$, $SC_2$, $SC_3$, each of which is connected across input leads $L_1$ and $L_2$. The input leads $L_1$ and $L_2$ connect to input terminals 110 and 112 which are adapted for connection to a suitable alternating supply 114 such as a 120 volt, 60 cycle commercial supply, to normally open switch 116. The switch 116 is a double pole, single throw switch provided in order to make power immediately available to the three sub-circuits and to deenergize the source 48 when not in use.

Prior to energizing the source 48 by closing switch 116, the control arm 118 of a control autotransformer $T_1$ is set to regulate the voltage to the desired level for charging the capacitors $C_1$ and $C_2$ of the capacitor bank. Upon closing switch 116, the primary windings $P_2$ and $P_3$ of power supply transformers $T_2$ and $T_3$ respectively and the winding $P_1$ of autotransformer $T_1$ are immediately energized. The transformers $T_2$ and $T_3$ respectively provide the input power supplied for sub-circuits $SC_2$ and $SC_3$ while autotransformer $T_1$ regulates the initial level of charging voltage supplied to the capacitor bank.

The power supply transformer $T_3$ provides 110 volt alternating current to a solid state rectifier bridge 125, which in turn supplies full wave rectified direct current through normally closed time delay relay $TD_1$ thereby charging capacitor $C_4$ almost instantly. Simultaneously, the power supply transformer $T_2$ provides 1400 volts alternating current to a half wave rectifier 126, which is excited by the output of transformer $T_4$. Subsequently, a current limiting resistor $R_2$ which is interposed in the output line of the rectifier 126, allows the capacitor $C_3$ to quickly reach a full charge of approximately 1400 volts. At this time, a thyratron $S_2$ which is connected in parallel with the capacitor $C_3$, is nonconducting as it has insufficient grid potential to cause ignition.

While the capacitor $C_3$ is being charged, the output of the control autotransformer $T_1$ is applied across the primary winding $P_5$ of a step-up transformer $T_5$. To limit the peak current, a choke $L_1$ is connected in series with the winding $P_1$ of autotransformer $T_1$. The output of transformer $T_5$, at a voltage predetermined by the setting of autotransformer $T_1$, is fed to a solid stator rectifier bridge 128. The rectifier bridge in turn feeds fully rectified current through a current limiting resistor $R_1$ in order to charge the capacitor bank $C_1$ and $C_2$ to the predetermined voltage level.

Subsequently, after a preset time interval, the normally closed time delay relay $TD_1$ opens, removing capacitor $C_4$ from its charging circuit. Coinstantaneously, a normally open time delay relay $TD_2$ closes, allowing the capacitor $C_4$ to discharge across a resistor $R_4$, driving the grid of thyratron $S_2$ positive, thereby causing the thyratron $S_2$ to ignite. As thyratron $S_2$ ignites, the capacitor $C_3$ discharges across a resistor $R_3$ and through the primary winding $P_6$ of a pulse transformer $T_6$. The output from transformer $T_6$ drives the ignitron $S_1$ to conduction, thereby allowing the capacitor bank $C_1$, $C_2$ to be discharged across the output terminals 44 and 46 of the source 48. The transformer $T_6$ is a 1:1 isolation transformer which is provided to prevent the possibility of the high voltage output through ignitrons $S_1$ being fed to sub-circuits $SC_2$ and $SC_3$ and thereby injuring operating personnel. Thus, it is apparent that the exemplified source 48 is unusually safe in operation.

In order to provide a specific illustration of the energy surge source 48 as described above, values of several circuit components employed in actual practice have been identified in FIG. 8, but it will be recognized that other values and exact components may be used. It will be further apparent that various coil press-back and compacting operations on inductive devices such as stator cores, armatures and other coil-accommodating members can be economically and efficiently accomplished in a safe and effective manner by the present invention without utilizing mechanical members physically contacting the windings. Further, the coil press-back operations can be accomplished without the need for special connections to be made to the windings or coil groups carried by the stator core.

It will be appreciated that in accordance with my invention, permanent magnets may be supported adjacent the end turn portions 52 of the coil groups in order to aid in the contouring of the end turn portions as they are pressed-back toward the faces 31 and 54 of the stator core. The permanent magnets for aiding in the contouring of the end turn portions of the coil groups may be rigidly supported on the opposite side of the end turn portions as the coiled conductors 34 and 36 or the permanent magnets 106 and 108, being of the proper polarity to attract the coil group end turn portions.

While in accordance with the patent statutes, I have described what at present are considered to be the preferred embodiments of my invention, it will be obvious to those skilled in the art that numerous changes and modifications may be made therein within the true spirit and scope of the invention.

What I claim as new and desire to secure by Letters Patent of the United States is:

1. An apparatus for effecting a desired press-back of an electrical coil in an inductive device, comprising means for arranging the inductive device in a load circuit; and a pulsing circuit connectable between the load circuit and a source of alternating current for producing an electrical energy pulse in the load circuit to effect the desired press-back of the electrical coil, said pulsing circuit having energy storage means, means for providing a charging voltage to said energy storage means, first normally open switch means connected across the output of said energy storage means and preventing the discharge thereof into the load circuit, a first sub-circuit connected to said first normally open switch means for selective closing thereof, said first sub-circuit including first means for providing an electrical pulse and second normally open switch means, a second sub-circuit connected to said second normally open switch means for selective closing thereof, said second sub-circuit including second means for providing an electrical pulse and normally open time delay means, said second means for providing an electrical pulse connected through said time delay means to said second normally open switch means, said normally open time delay means closing after a predetermined time period at which time said second means for providing an electrical pulse causes said second normally open switch means to close and thereafter said first means for providing an electrical pulse causes said first normally open switch means to close allowing said previously charged energy storage means to discharge the electrical energy pulse into the load circuit having the means for arranging the inductive device therein.

2. An apparatus for producing an electrical energy pulse and a desired change in position and configuration of an electrical coil carried in a magnetic core, the apparatus comprising means for connecting the coil and magnetic core in a load circuit; electrical energy storage means, means for providing a charging voltage to said electrical energy storage means, first normally open switch means connected across the output of said electrical energy storage means and permits the discharge thereof, a first sub-circuit connected to said first normally open switch means for selective closing thereof, said first sub-circuit including first means for providing an electrical pulse and second normally open switch means, a second sub-circuit connected so said second normally open switch means for selectively closing thereof, said second sub-circuit including second means for providing an electrical pulse and normally open time delay means, said seond means for providing an electrical pulse connected through said time delay means to said second normally open switch means, said normally open time delay means closing after a predetermined time period at which time said second means for providing an electrical pulse causes said second normally open switch means to close and thereafter said first means for providing an electrical pulse causes said first normally open switch means to close allowing said previously charging energy storage means to discharge an electrical energy pulse of a selected magnitude into the load circuit for effecting the desired change in coil position and configuration.

3. Apparatus for effecting the desired alteration in configuration in position of an electrical coil with respect to a magnetic core of an inductive device, the apparatus comprising: means for mounting the device in a load circuit, first energy storage means, means for providing a charging voltage to said first energy storage means, and first normally open switch means for electrically isolating said first energy storage means from said load when the switch means is in the open condition; a second sub-circuit electrically connected to said first normally open switch means for selective closing thereof, said second sub-circuit including second energy storage means and second normally open switch means, means for coupling said second energy storage means to the source for charging said second energy storage means, said second normally open switch means preventing discharge of said second energy storage means when in an open condition; and a third sub-circuit connected to said second normally open switch means for selective closing thereof, a third energy storage means, normally closed time delay means for connecting said third energy storage means to the source for charging thereof for a predetermined period of time, normally open time delay means connecting said third energy storage means to said second normally open switch means, said normally closed time delay means opening after the predetermined period of time and said normally open time delay means closing substantially simultaneously therewith whereby said third energy storage means discharges into and closes said second normally open switch means, said second energy storage means discharges into and closes said first normally open switch means, and said first energy storage means discharges across the load circuit thereby generating a pulse of electrical energy in the inductive device for the desired alteration in configuration of the electrical coil.

4. A pulsing circuit connectable to a source of alternating current for producing a high voltage energy pulse comprising: energy storage means, means for providing a charging voltage to said energy storage means, first normally open switch means connected across the output of said energy storage means and preventing the discharge thereof, a first sub-circuit connected to said first normally open switch means for selective closing thereof, said first sub-circuit including first means for providing an electrical pulse and second normally open switch means, a second sub-circuit connected to said second normally open switch means for selective closing thereof, said second sub-circuit including second means for providing an electrical pulse and normally open time delay means, said second means for providing an electrical pulse connected through said time delay means to said second normally open switch means, said normally open time delay means closing after a predetermined time period at which time said second means for providing an electrical pulse causes said second normally open switch means to close and thereafter said first means for providing an electrical pulse causes said first normally open switch means to close allowing said previously charged energy storage means to discharge.

5. A pulsing circuit connectable to a source of alternating current for producing a high voltage energy pulse to energize an inductive load and to establish a dynamic magnetic field for displacing end turn portions of electrical coils comprising: a first sub-circuit electrically coupled to the load and including first energy storage means, means for providing a charging voltage to said first energy means, and first normally open switch means for electrically isolating said first energy storage means from said load when the switch means is in the open condition; a second sub-circuit electrically connected to said first normally open switch means for selective closing thereof, said second sub-circuit including second energy storage means and second normally open switch means, means for coupling said second energy storage means to the source for charging said second energy storage means, said second normally open switch means preventing discharge of said second energy storage means when in an open condition; and a third sub-circuit connected to said second normally open switch means for selective closing thereof, a third energy storage means, normally closed time delay means for connecting said third energy storage means to the source for charging thereof for a predetermined period of time, normally open time delay means connecting said third energy storage means to said second normally open switch means, said normally closed time delay means opening after the predetermined period of time and said normally open time delay means closing substantially simultaneously therewith whereby said third energy storage means discharges into and closes said second normally open switch means, said second energy storage means discharges into and closes said first normally open switch means, and said first energy storage means discharges across the inductive load thereby energizing the load and establishing the dynamic magnetic field.

6. A pulsing circuit connectable to a source of alternating current for producing a high voltage energy pulse comprising: energy storage means, means for providing a charging voltage to said energy storage means, first normally open switch means connected across the output of said energy storage means and permits the discharge thereof, a first sub-circuit connected to said first normally open switch means for selective closing thereof, said first sub-circuit including first means for providing an electrical pulse and second normally open switch means, a second sub-circuit connected to said second normally open switch means for selective closing thereof, said second sub-circuit including means for providing an electrical pulse and normally open time delay means, said second means for providing an electrical pulse connected through said time delay means to said second normally open switch means, said normally open time delay means closing after a predetermined time period at which time said second means for providing an electrical pulse causes said second normally open switch means to close and thereafter said first means for providing an electrical pulse causes said first normally open switch means to close allowing said previously charged energy storage means to discharge.

References Cited

UNITED STATES PATENTS 3,333,328 8/1967 Rushing _____ 29—596
3,407,473 10/1968 Rushing _____ 29—205

THOMAS H. EAGER, Primary Examiner

U.S. Cl. X.R.

29—596